United States Patent
Mihira

(10) Patent No.: US 9,098,219 B2
(45) Date of Patent: Aug. 4, 2015

(54) PRINTING SYSTEM, IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Yoshiro Mihira, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/502,342

(22) Filed: Sep. 30, 2014

(65) Prior Publication Data

US 2015/0103375 A1    Apr. 16, 2015

(30) Foreign Application Priority Data

Oct. 11, 2013  (JP) .................................. 2013-214138

(51) Int. Cl.
*G06F 15/00* (2006.01)
*G06F 3/12* (2006.01)
*G06K 1/00* (2006.01)

(52) U.S. Cl.
CPC .............. *G06F 3/1221* (2013.01); *G06F 3/129* (2013.01); *G06F 3/1229* (2013.01)

(58) Field of Classification Search
CPC ..... G06F 3/1221; G06F 3/1229; G06F 3/129; G06K 15/02
USPC ................................ 358/1.1, 1.13, 1.14, 1.15
See application file for complete search history.

(56) References Cited

U.S. PATENT DOCUMENTS

2012/0105901 A1*  5/2012  Miyazaki et al. ............ 358/1.14
2013/0301076 A1*  11/2013  Rizzo et al. .................. 358/1.15

FOREIGN PATENT DOCUMENTS

JP         2011-9980 A        1/2011

* cited by examiner

*Primary Examiner* — Douglas Tran
(74) *Attorney, Agent, or Firm* — Fitzpatrick, Cella, Harper & Scinto

(57) ABSTRACT

An image forming apparatus capable of being connected to a network via a print server updates media data in response to a modification operation for modification of the media data, and starts a recording of the updating of the media data when the print server is in a power saving state. Then, the print server transmits to the print server, in a case where the updating of the media data has been recorded when a notification that the print server returned from the power saving state is received, the updated media data.

10 Claims, 16 Drawing Sheets

FIG. 7

| MY COMPUTER | | | | |
|---|---|---|---|---|
| FILE(F) EDIT(E) DISPLAY(V) HELP(H) | | | | |
| Hold Job / Printed Job | | | | |
| # NAME | SIZE | TYPE | DATE | |
| 1 MENU-2012 | 1.1M | PS | 2012/08/11 13:01 | |
| 2 Agenda-Aug-12-2012 | 10.2M | PS | 2012/08/10 10:10 | [!!] — 701 |
| 3 Manual-Rev.2.3 | 23.1M | PS | 2012/08/10 9:10 | |
| 4 reference-card-ver1 | 5.2M | PDF | 2012/08/10 8:33 | [!!] — 702 |

FIG. 13

| MEDIA LIBRARY RECORDING FLAG | ON | | 1301 |
|---|---|---|---|
| NAME | Weight, Size | MODIFICATION | 1302 |
| MEDIA A | 75g/m²    A4 | EXISTS | 1303 |
| MEDIA B | 250g/m²    A4 | DOES NOT EXIST | |
| MEDIA C | 250g/m²    LTR | DOES NOT EXIST | |
| MEDIA D | 76g/m²    A3 | DOES NOT EXIST | |

PRINTING SYSTEM, IMAGE FORMING APPARATUS, METHOD OF CONTROLLING THE SAME, AND STORAGE MEDIUM

BACKGROUND OF THE INVENTION

1. Field of the Invention

The present invention relates to a printing system, an image forming apparatus, a method of controlling the same, and a storage medium.

2. Description of the Related Art

As in a lot of electronic products, there is a need for power saving in printing apparatuses such as printers. More specifically, configuration is taken so as to, as much as possible, not consume power pointlessly by causing the printing apparatus to shift to a sleep state (a power saving state) in a case where the printing apparatus has not been used for a predetermined interval. This same in a case where a print server is connected to the printing apparatus, and there is a need for reducing power consumption by putting the printing apparatus into the sleep state under a condition in which the printing apparatus has not been used for a predetermined interval.

Also, the printing apparatus registers information of many kinds of paper in a database of the printing apparatus, assigns the registered information of paper to a paper feed cassette, and in a case where a paper is fed from the paper feed cassette, determines printing conditions based on the information of the paper assigned to the paper feed cassette, and prints. Also in a case where the print server is connected to the printing apparatus, the database of the information of the paper is similarly provided in the print server.

In Japanese Patent Laid-Open No. 2011-9980, a technique is disclosed in which a notification about whether or not information of paper used for a job held in a printing apparatus is set to a paper feed cassette, and whether or not the paper is housed in the paper feed cassette, is made based on the information of paper designated by the job and information of paper assigned to the paper feed cassette. However, in a case where this function is included in the print server, the following problem arises.

The print server determines whether or not the paper required for executing the job is set to the paper feed cassette in a printing apparatus by comparing the information of the paper designated by the job with the information of the paper database in the print server. However, when the print server is in the power saving state, if the information of the paper in the paper database in the printing apparatus is overwritten, the print server cannot know that this happened. For this reason, when the print server returns from the power saving state to a normal state (wake-up state), a user is notified that a paper required for execution of a job exists, even if the information of paper of the printing apparatus is modified and the job has become unexecutable, because it is determined whether or not the paper required for the execution of the job is set based on the information of the paper database in the print server.

In such a case, upon execution of the job by the printing apparatus, it is determined that the information of the paper designated by the job does not match with the information of the paper set to the paper feed cassette of the printing apparatus, and an error will be reported to the user. In this way, during the power saving state of the print server, in a case where the information of the paper in a print sheet database of the printing apparatus is overwritten, a user cannot confirm whether or not the paper required for the printing apparatus is set until the point in time when the printing apparatus executes the job.

SUMMARY OF THE INVENTION

An aspect of the present invention is to eliminate the above-mentioned problems with conventional technology.

A feature of the present invention is to provide a technique by which it is possible to synchronize media data of a print server and media data of an image forming apparatus even in a case where the media data of the image forming apparatus is updated while the print server is in a power-saving state.

The present invention in its first aspect provides an image forming apparatus capable of being connected to a network via a print server, the image forming apparatus comprising: an update unit configured to update media data in response to a modification operation for modification of the media data; a starting unit configured to start a recording of the updating of the media data by the update unit when the print server is in a power saving state; and a transmission unit configured to transmit to the print server, in a case where the updating of the media data by the update unit has been recorded when a notification that the print server returned from the power saving state is received, the updated media data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts a view for illustrating an example of a list of hold jobs displayed by the external image processing controller according to embodiments.

FIG. 13 depicts a view for explaining a media library recording flag according to embodiments.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

Figure 1:
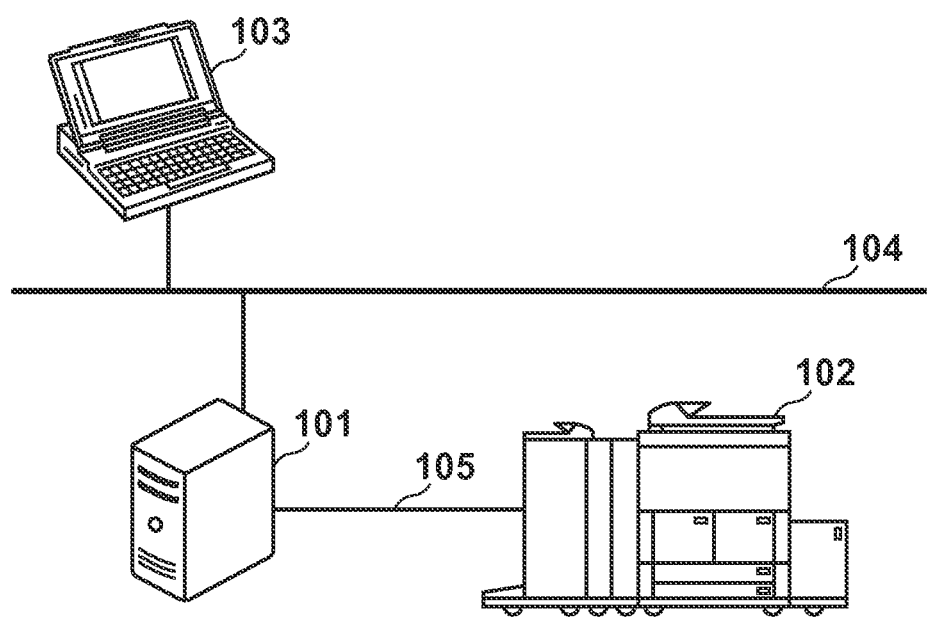
FIG. 1 depicts a view for showing a configuration of an overview of a printing system according to embodiments of the present invention.

FIG. 1 depicts a view for showing a configuration of an overview of a printing system according to embodiments of present invention.

An external image processing controller 101 is a print server connected between a network 104 and an image forming apparatus 102. The image forming apparatus 102, in combination with the external image processing controller 101, is comprised in a single image forming system. A PC client 103 is connected to the network 104, and performs, towards the image forming system comprising the external image processing controller 101 and the image forming apparatus 102, a print instruction, an inputting of a job to be held, and a confirmation of job list, or the like, via the network 104. The network 104 is a network connecting the external image processing controller 101 and the PC client 103, and is a network realizing a LAN connection such as, for example, an Ethernet™ network. A network 105 is a network connecting the external image processing controller 101 and the image forming apparatus 102.

Figure 2:
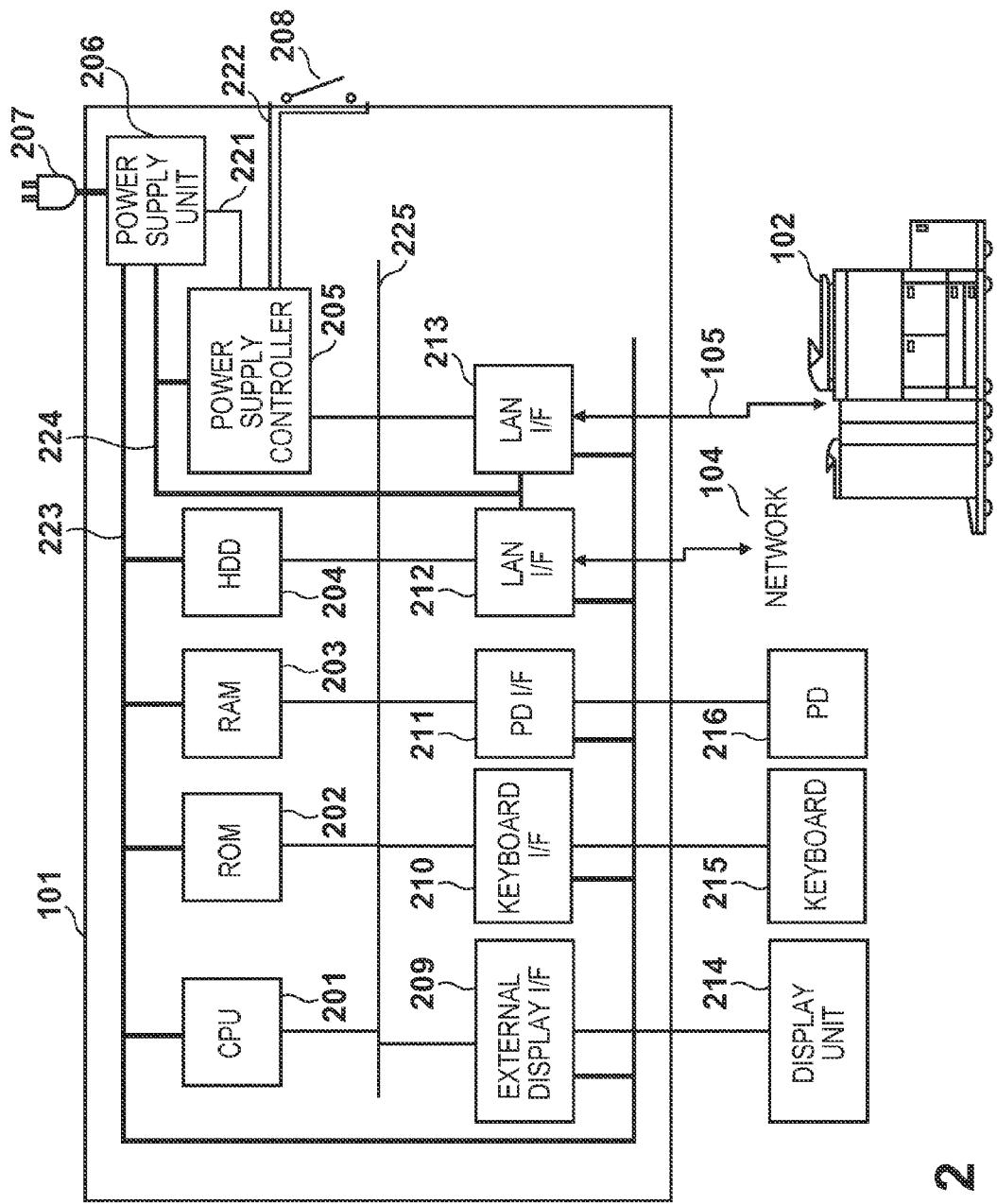
FIG. 2 is a block diagram for showing a hardware configuration of an external image processing controller according to embodiments.

FIG. 2 is a block diagram for showing a hardware configuration of the external image processing controller 101 according to embodiments.

The external image processing controller (a DFE: a Digital Front End) 101 comprises a CPU 201, a ROM 202, a RAM 203, an HDD 204, a power supply controller 205, a power supply unit 206, a power plug 207, a main power switch 208, an external display I/F 209, a keyboard I/F 210, a PD (a pointing device) interface 211, and LAN I/Fs 212 and 213.

The external image processing controller 101 is able to communicate with the PC client 103 by connecting to the network 104 via the LAN I/F 212. The external image processing controller 101 is able to receive a wake-up instruction or a print job from the PC client 103. Also, the LAN I/F 212 is connected to an internal bus 225, and is able to notify the power supply controller 205 of a print instruction from the PC client 103. With this, it is possible for the external image processing controller 101 to recover from a power saving state to a normal power state (wake-up state). Additionally, the external image processing controller 101 connects to the network 105 via the LAN I/F 213, communicates with the image forming apparatus 102, and can make a wake-up instruction or a print instruction to the image forming apparatus 102. Conversely, the LAN I/F 213 is able to notify the power supply controller 205 of the activation instruction when the LAN I/F 213 receives a wake-up instruction from the image forming apparatus 102 via the network 105. With this, it is possible for the external image processing controller 101 to recover from the power saving state to the wake-up state.

The power supply controller 205 connects to the internal bus 225, and connects to the main power switch 208 via a main power switch line 222. The power supply controller 205 controls, upon a wake-up instruction from the LAN I/Fs 212 and 213, via a power supply unit control line 221 so that the power supply unit 206 supplies electric power to a main power supply line 223. Also, when a pressing of the main power switch 208 by a user is detected, it is possible to activate a power supply from the power supply unit 206 to the main power supply line 223.

The power supply unit 206 converts alternating-current power supply supplied from the power plug 207 into a direct-current voltage and supplies the direct-current voltage to the standby power supply line 224 and the main power supply line 223. The standby power supply line 224 is a power supply line that supplies continuous electric power to the LAN I/Fs 212 and 213. Here, continuous electric power is supplied to the LAN I/Fs 212 and 213 and the power supply controller 205 in order that the LAN I/Fs 212 and 213 be able to receive the activation instruction from the networks 104 and 105 at any time. The main power supply line 223 is a main power supply line whose power supply is controlled by an instruction from the power supply controller 205. The internal bus 225 is comprised of, for example, a PCI bus, or the like, and is used for data communication between the modules.

A display unit 214 is a display for displaying a message to a user, operating state, or the like. A keyboard 215 is operated by a user and used for inputting various information. A pointing device (PD) 216 is used for a movement of a cursor, or the like, on the display unit 214, for various instructions, or the like. Note that a touch panel, or the like, for example, may be used in place of the display unit 214, the keyboard 215, and the PD 216.

Figure 3:
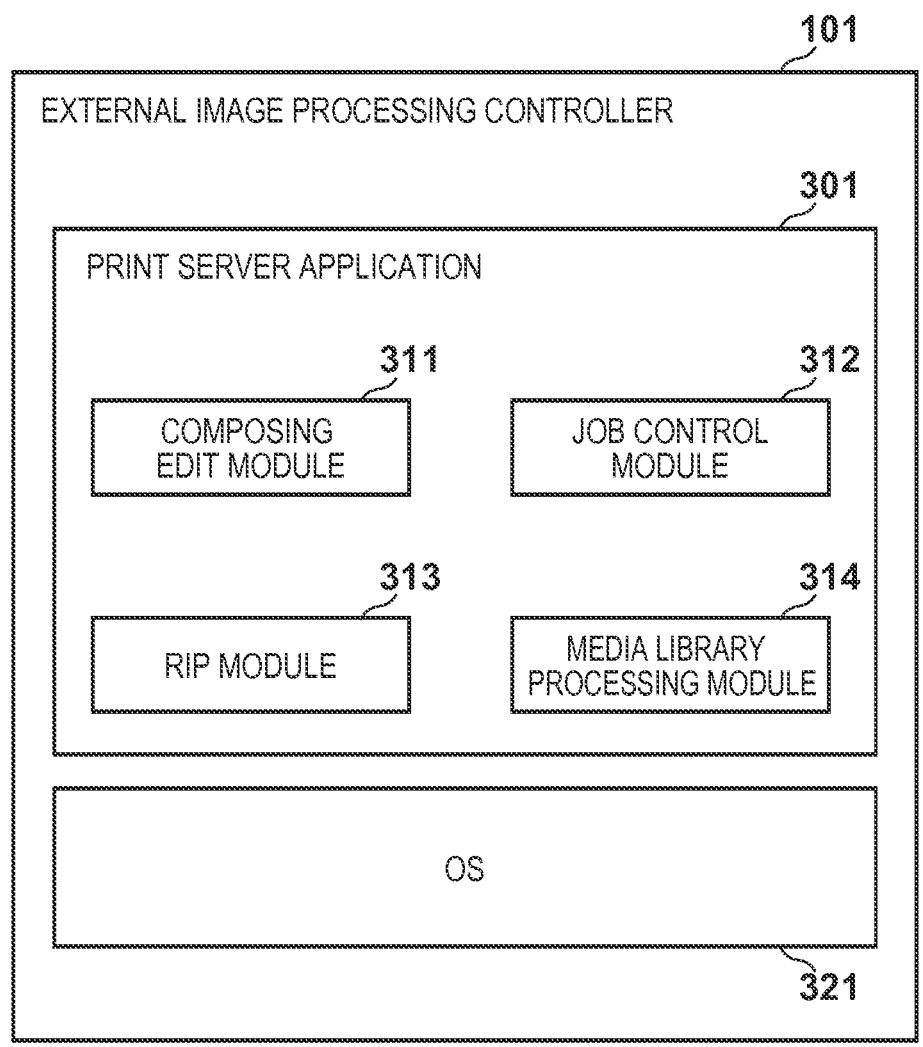
FIG. 3 is a block diagram for explaining software modules of the external image processing controller according to embodiments.

FIG. 3 is a block diagram for explaining software modules of the external image processing controller 101 according to embodiments. Programs realizing each software module in FIG. 3 are stored in the HDD 204, and deployed into the RAM 203, and executed by the CPU 201 upon the execution.

An OS 321 is an OS (operating system) which is base software of the external image processing controller 101. A print server application 301 is application software that operates on the OS 321 and is executed by the CPU 201. The print server application 301 comprises a composing edit module 311, a job control module 312, a RIP module 313, and a media library processing module 314.

The composing edit module 311 performs composing editing processing for editing image data of each page into a composing format for bookbinding based on an instruction from the PC client 103. The job control module 312 controls a print job based on an instruction from the PC client 103. More specifically, the job control module 312 controls the reception of print data or a hold job from the PC client 103, the execution sequence of jobs, or the like. The RIP (raster image) processing unit 313 is called in a case of composing by the composing edit module 311 or of performing image formation process in the job control module 312, and converts a page description language (PDL) into a raster image for printing. The media library processing module 314 stores paper information (media data). Also, media library data synchronization processing for synchronization with a media library processing module 507 (FIG. 5) of the image forming apparatus 102 explained later is performed.

Figure 4:
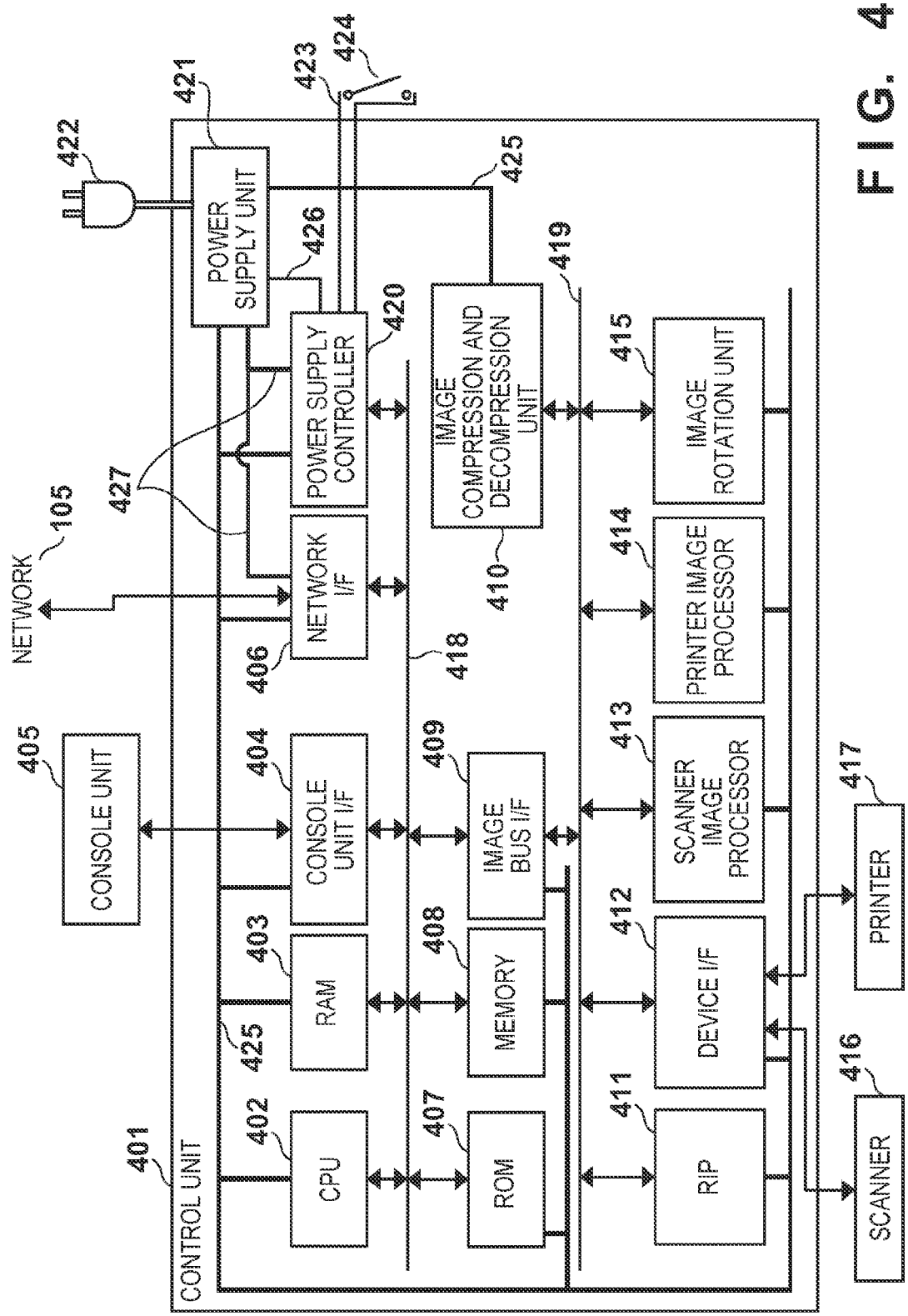
FIG. 4 is a block diagram for showing a hardware configuration of an image forming apparatus according to embodiments.

FIG. 4 is a block diagram for showing a hardware configuration of the image forming apparatus 102 according to embodiments.

A control unit 401 connects to a scanner 416 for scanning an image of a document, or the like, and inputting image data, and a printer 417. Also, communication with the external image processing controller 101 is performed via the network 105. Input and output of image information or device information are also performed.

A CPU 402 controls the image forming apparatus 102 on the whole. A RAM 403 is a system work memory used when the CPU 402 operates, and is an image memory for temporarily storing image data. A ROM 407 is a boot ROM and stores a boot program of the image forming apparatus 102. A memory 408 is a hard disk drive (HDD) and stores system software or application software shown in FIG. 5, image data, or the like. Print jobs including a print job received from the PC client 103 or the external image processing controller 101 are stored in an image data storage area in the memory 408. A console unit interface 404 is an interface unit for a console unit 405 that outputs image data to be displayed on the console unit 405, and transmits information that a user inputs via the console unit 405 to the CPU 402. For example, a user can modify paper information for the paper housed in a sheet feeding cassette of the printer 417, or modify a media library in the image forming apparatus 102, using the console unit 405.

A network I/F 406 is connected to the network 105, and performs input and output of information via the network 105. An image bus I/F 409 is a bus bridge for converting a data configuration, and is connected between a system bus 418 and an image bus 419 for transferring image data at high speed. The image bus 419 is a PCI bus or an IEEE 1394 bus. A raster image processor (RIP) 411, a device I/F 412, a scanner image processor 413, a printer image processor 414, an image rotation unit 415, and an image compression and decompression unit (CODEC) 410 are arranged in the image bus 419. The RIP 411 expands a PDL code into a bitmap image. The device I/F 412 connects the scanner 416 and the printer 417 and the control unit 401. The scanner image processor 413 performs correction, processing, and editing of image data input from the scanner 416. The printer image processor 414 performs a correction, resolution transformation, or the like to image data output to the printer 417. The image rotation unit 415 performs a rotation of image data. An image compression and decompression unit 410 converts multi-valued image data to JPEG, and performs compression/decompression processing of JBIG, MMR, or MH for binary image data.

A power supply controller 420 connects to the internal bus 418, and connects to a main power switch 424 via a main power switch line 423, and can detect a pressing of the main power switch 424 by a user. The power supply controller 420 can control a power supply unit 421 via a power supply unit control line 426 and activate a power supply to a main power supply line 425, based on a wake-up notification from the main power switch 424. The power supply unit 421 generates a direct-current voltage and current used in the apparatus using alternating-current power supply supplied from a power plug 422. The electric power is supplied to each of the above described units via a sleep power supply line 427 and the main power supply line 425. The sleep power supply line 427 is a power supply line to which continuous electric power is supplied. In order to make the image forming apparatus 102 in the power saving state (sleep state) capable of receiving a wake-up instruction from the external image processing controller 101 via the network 105, continuous electric power is supplied to the network I/F 406 and the power supply controller 420. The main power supply line 425 is a main power supply line and its power supply is controlled by an instruction from the power supply controller 420.

Figure 5:
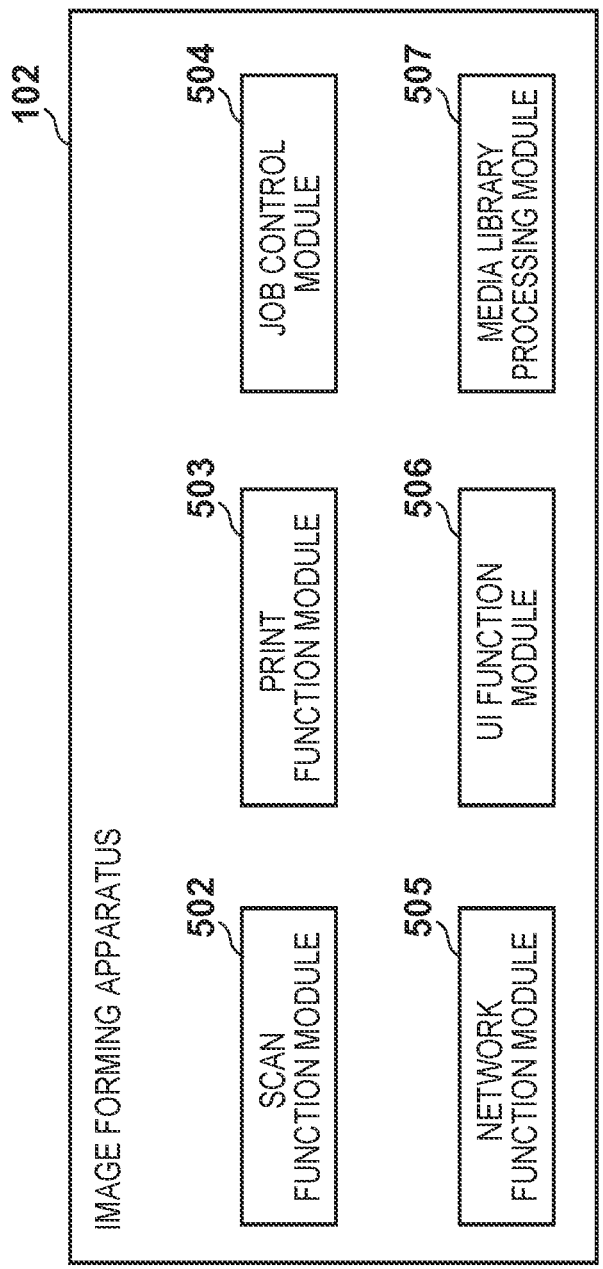
FIG. 5 is a block diagram for explaining software modules of the image forming apparatus according to embodiments.

FIG. 5 is a block diagram for explaining software modules of the image forming apparatus 102 according to embodiments. Programs for executing these software modules are stored in the memory 408, and these functions corresponding to the modules are realized by deploying the programs into the RAM 403 and by the CPU 402 executing the programs.

A scan function module 502 scans a paper document using the scanner 416, generates image data, and converts the image data into binary or multi-valued image data. A print function module 503 outputs image data obtained by the scan function module 502 to the printer 417, attaching a command towards the printer 417. A job control module 504 performs queuing the image data received from the scan function module 502 functioning as a print job. The job control module 504 also queues print jobs that a network function module 505 receives, and outputs towards the print function module 503 or to the later explained network function module 505. The network function module 505 has various network protocol functions such as TCP/IP, HTTP, FTP, LDAP, SNMP, SMTP, SSL, SMB, or the like. The network function module 505 receives a print job from the external image processing controller 101 via the network I/F 406. A user interface (UI) function module 506 manages input and output by a user made via the console unit 405. Additionally, the user interface function module 506 displays an input field, an output message field, or the like, on the console unit 405, receives an input value for the input field from a user and makes a notification to other functional modules. Also, a function, which displays a message for a user from another functional module on a screen designed in advance, is comprised. Additionally, a function which displays a screen for modifying the media library, or for modifying a sheet setting of the sheet feeding cassette is comprised. A media library processing module 507 manages the paper information of the image forming apparatus 102, and performs management of the media library and synchronization processing of the media library information with the cooperating external image processing controller 101.

Figure 6:
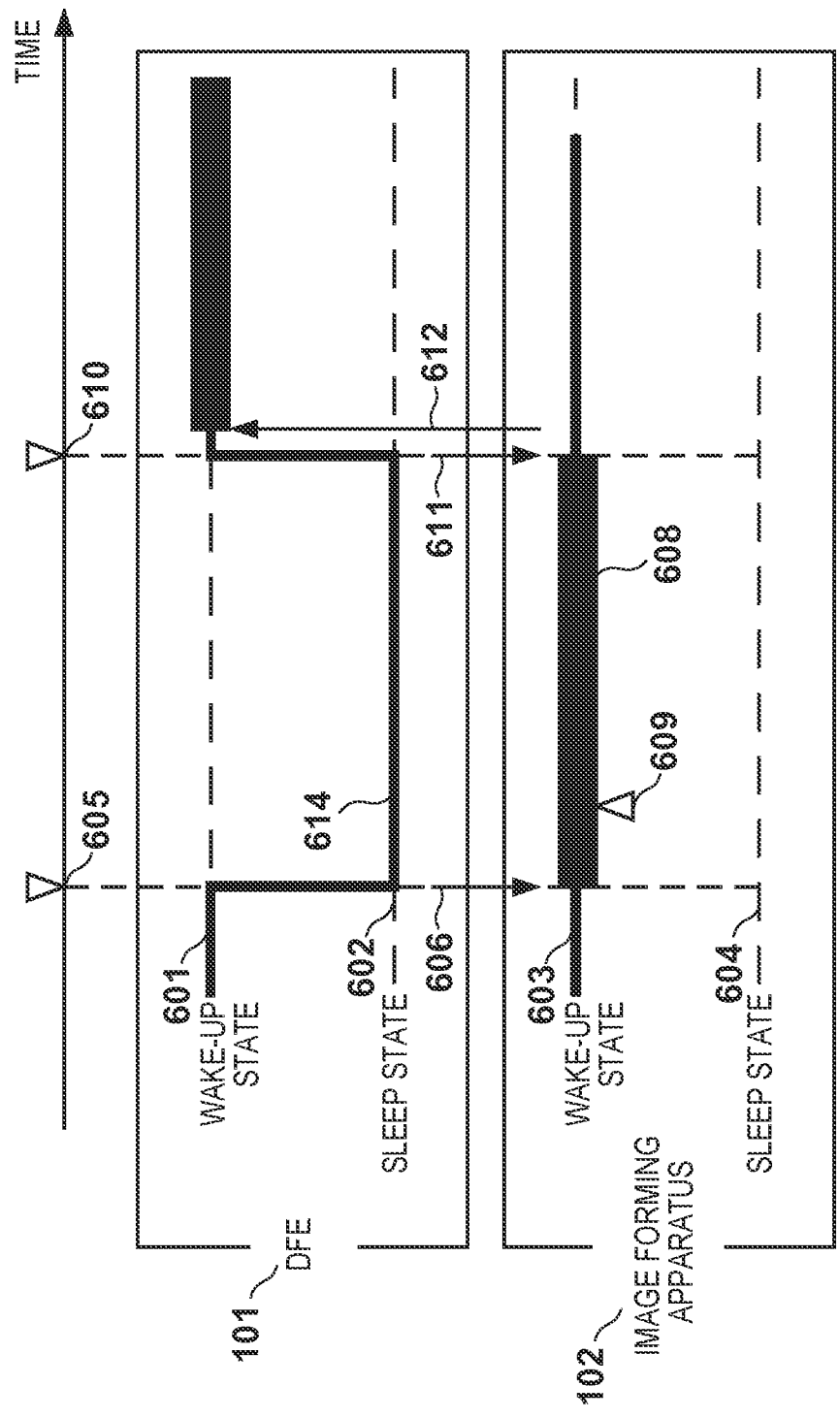
FIG. 6 depicts a view for explaining an operation sequence in a case where only the external image processing controller according to embodiments enters a sleep state, and a media library of the image forming apparatus is modified during the sleep state.

FIG. 6 depicts a view for showing an operation sequence for a case where only the external image processing controller 101 according to embodiments enters the sleep state, and while the external image processing controller 101 is in the sleep state, a user modifies the media library with the image forming apparatus 102.

Reference numeral 601 denotes the external image processing controller 101 being in a wake-up state, and reference numeral 602 denotes the external image processing controller 101 being in the sleep state. Similarly, reference numeral 603 denotes the image forming apparatus 102 being in the wake-up state, and reference numeral 604 denotes the image forming apparatus 102 being in the sleep state. A solid line portion denotes a power supply state of the external image processing controller 101 and the image forming apparatus 102 respectively. For example, reference numeral 614 denotes the external image processing controller 101 being in the sleep state.

Firstly, at a timing 605, the external image processing controller 101 shifts into the sleep state. The reason for the shift into the sleep state is that the external image processing controller 101 does not receive a job from the PC client 103 for a predetermined fixed period such as 5 minutes, for example. In such a case, shifting into the sleep state (a power saving state) is performed automatically for power savings. Here, the external image processing controller 101, prior to shifting into the sleep state at reference numeral 606, notifies the image forming apparatus 102 that the external image processing controller 101 shifts into the sleep state.

With this, the image forming apparatus 102 shifts into a state in which the external image processing controller 101 is in the sleep state and media library modification processing is recorded on the image forming apparatus 102, when the notification is received (a bold line 608 denotes the recording state). This processing will be explained later with reference to FIG. 12. At a timing 609, a user performs an operation for modifying the media library of the image forming apparatus 102 via the console unit 405 of the image forming apparatus 102. This is, for example, an operation for modifying a sheet weight of media A. This modification recording method will be explained later with reference to FIG. 15.

Next, at a timing 610, the external image processing controller 101 recovers to the wake-up state from the sleep state. A specific reason for this is that a wake-up notification is received from the PC client 103, or the like. With this, the external image processing controller 101, at reference numeral 611, notifies the image forming apparatus 102 that the external image processing controller 101 recovers from the sleep state. With this, the image forming apparatus 102 determines whether or not the media library of the image forming apparatus 102 has been modified while the external image processing controller 101 was in the sleep state based on the wake-up notification. If the media library of the image forming apparatus 102 has been modified, the image forming apparatus 102 notifies the external image processing controller 101 of the modification at reference numeral 612. This processing will be explained later with reference to FIG. 12. The external image processing controller 101, at reference numeral 612, receives the notification of the modification of the media library, and updates information of the media library of the external image processing controller 101. Also, if a hold job of the external image processing controller 101 is a job that uses the modified media, a media mismatch flag is set for the hold job. This processing will be explained later with reference to FIG. 14.

FIG. 7 depicts a view for illustrating an example of a list of hold jobs displayed by the external image processing controller 101 according to embodiments.

In FIG. 7, "Agenda-Aug. 12, 2012" for which a job number is "2", and "reference-card-ver1" for which a job number is "4" use the media A which is media data that is modified during the sleep state. For this reason, the media mismatch flag is set for these jobs, and it is displayed that a media mismatch occurs for these jobs as shown by icons 701 and 702 of the job list. With this, a user can recognize that the media mismatch occurs for these hold jobs.

Figure 8:
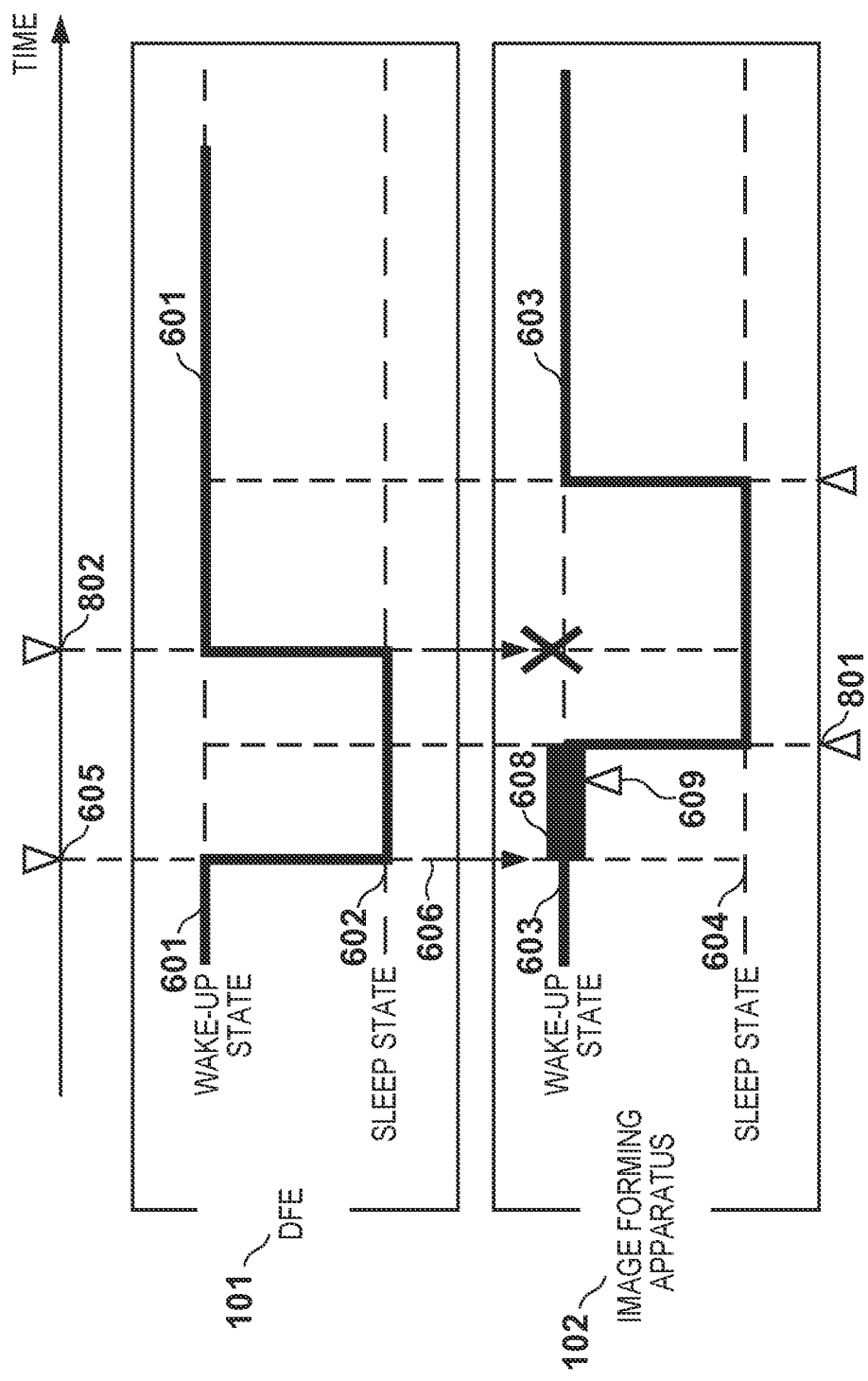
FIG. 8 depicts a view for explaining an operation sequence in a case where the image forming apparatus also shifts to the sleep state during the sleep state of the external image processing controller.

FIG. 8 is a sequence diagram for a case where the image forming apparatus 102 also shifts to the sleep state during the sleep state of the external image processing controller 101. Note that portions common to the previously described FIG. 6 are shown with the same reference numerals, and explanation is omitted.

Here, after the media library of the image forming apparatus 102 has been modified at reference numeral 609, the image forming apparatus 102 shifts to the sleep state at a timing 801. Then, at a timing 802, the external image processing controller 101 recovers from the sleep state. However, because the image forming apparatus 102 is in the sleep state at this time, the image forming apparatus 102 is not able to notify the external image processing controller 101 that the media library has been modified. For this reason, in such a case, an inconsistency occurs between the media library of the external image processing controller 101 and the media library of the image forming apparatus 102.

Figure 9:
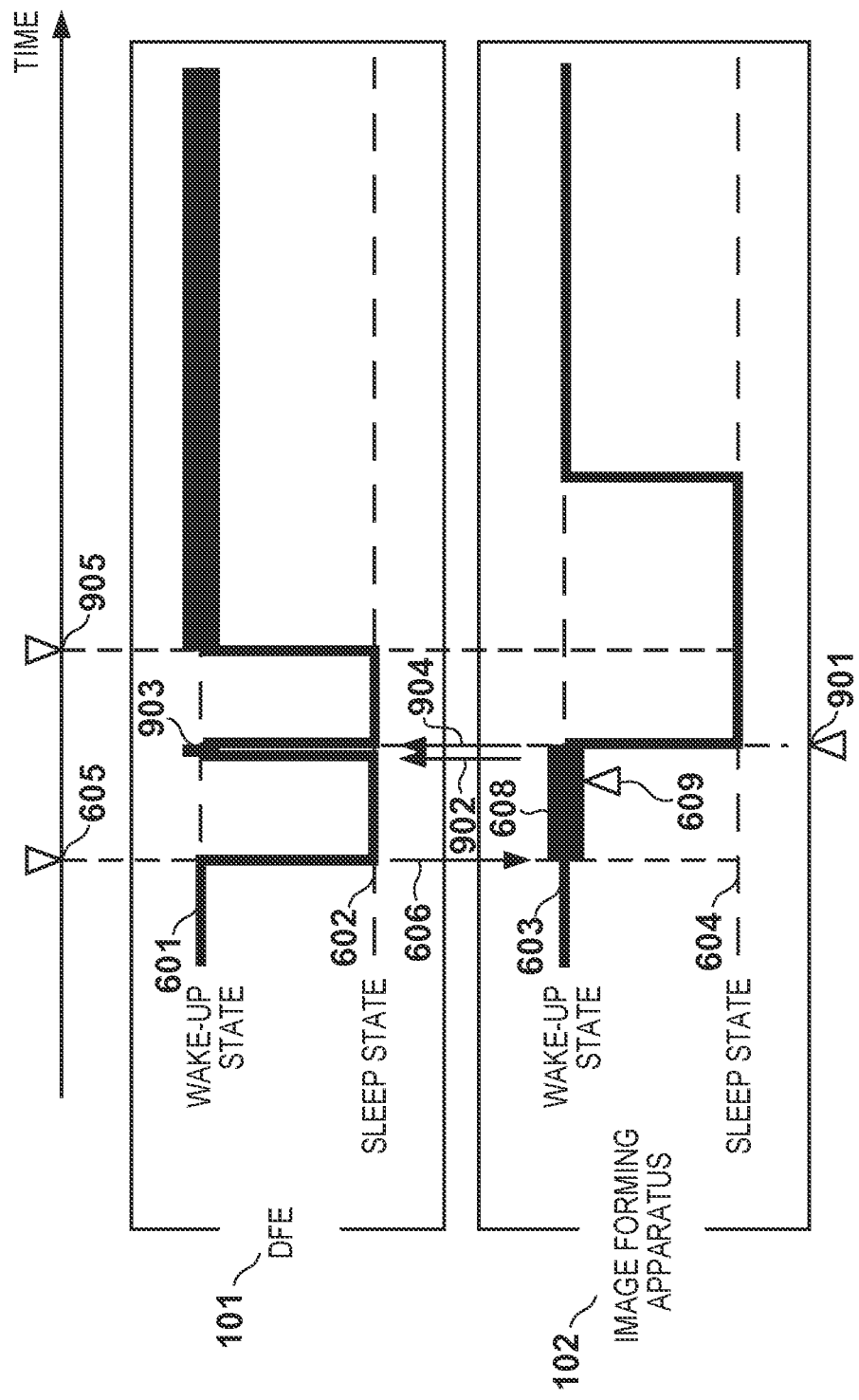
FIG. 9 depicts a view for explaining a sequence for solving a problem of FIG. 8.

FIG. 9 depicts a view for explaining a sequence for solving a problem of FIG. 8. Note that in FIG. 9, the processing is the same as that of FIG. 8 up until the timing 609.

Firstly, at a timing 605, the external image processing controller 101 shifts into the sleep state. Here, the external image processing controller 101, prior to shifting into the sleep state, at reference numeral 606, notifies the image forming apparatus 102 that the external image processing controller 101 shifts into the sleep state. With this, the image forming apparatus 102 turns on the media library recording flag when the image forming apparatus 102 receives the sleep state shift notification, and in reference numeral 608, the image forming apparatus 102 executes processing for recording media library modification. Then, at the timing 609, when a user performs a modification operation of the media library of the image forming apparatus 102 via the console unit 405 of the image forming apparatus 102, the modified information is recorded.

Then, at a timing 901, during the external image processing controller 101 is in the sleep state, the image forming apparatus 102 shifts into the sleep state. At this time, the image forming apparatus 102 prior to shifting into the sleep state, at the timing 902, performs a wake-up notification towards the external image processing controller 101. This processing will be explained later with reference to FIG. 16. The external image processing controller 101 recovers to the wake-up state at a timing 903 when the external image processing controller 101 receives the wake-up notification. Then the image forming apparatus 102, after confirming that the external image processing controller 101 has recovered, notifies the external image processing controller 101 of media library modification information at a timing 904. When the notification of the media library modification information has been completed, the external image processing controller 101 shifts into the sleep state once again. Also, the image forming apparatus 102 shifts to the sleep state.

After this, at a timing 905, the external image processing controller 101 activates by an instruction from the PC client 103, or the like. This time is different to the case of the timing 802 of FIG. 8 because the external image processing controller 101 has obtained the media library modification information in the image forming apparatus 102 at the timing 903. For this reason, for example, as shown in FIG. 7, media mismatch information can be displayed, and a user can distinguish easily a hold job for which a media mismatch occurred.

Figure 10:
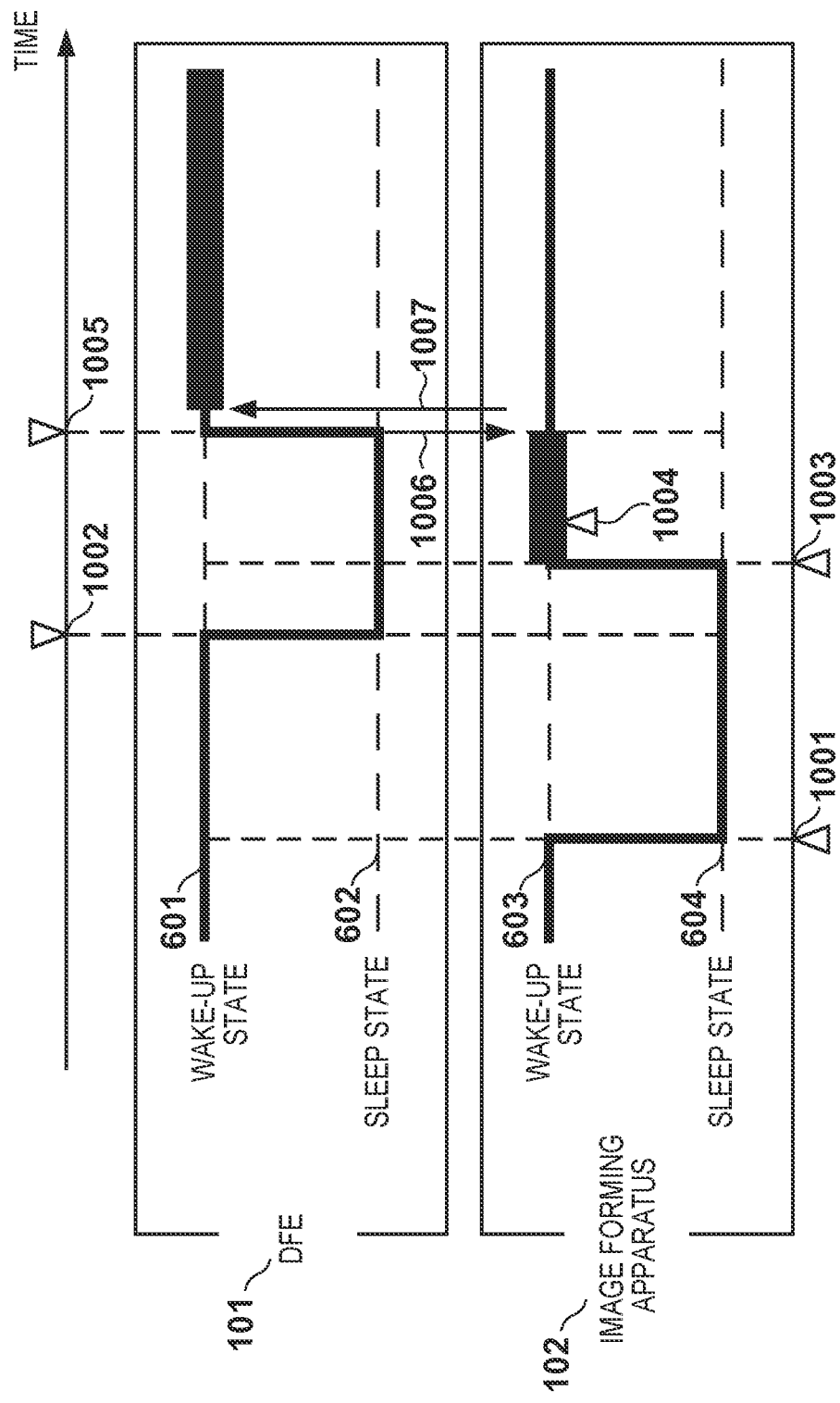
FIG. 10 depicts a view for explaining an operation sequence for explaining another example in which the external image processing controller and the image forming apparatus according to embodiments shift to the sleep state.

FIG. 10 is a sequence diagram for explaining another example in which the external image processing controller 101 and the image forming apparatus 102 according to embodiments shift to the sleep state. Note that parts common to the previously described drawings are indicated with the same reference numerals.

While the external image processing controller 101 is activated, the image forming apparatus 102 shifts to the sleep state at a timing 1001. Here, because a flag indicating that the media library has been modified is not set, the media library modification notification is not performed. Next, at a timing 1002, the external image processing controller 101 shifts into the sleep state. Then, at a timing 1003, the image forming apparatus 102 wakes up due to an operation via the console unit 405 by a user. Here, because the image forming apparatus 102 recovers during the external image processing controller 101 is in the sleep state, the media library recording flag is turned on. Details of this processing will be explained later with reference to FIG. 17. After this, at a timing 1004, a user modifies the media library by operating the console unit 405.

Next, when the external image processing controller 101 recovers from the sleep state at a timing 1005, notification of a recovery event is made from the external image processing controller 101 to the image forming apparatus 102 at a timing 1006. With this, the image forming apparatus 102, at a timing 1007, transfers the modified media library information to the external image processing controller 101. With this, the external image processing controller 101 is able to display identifiably hold jobs for which a media mismatch occurs by displaying the media mismatch information, as shown in FIG. 7, for example.

Figure 11:
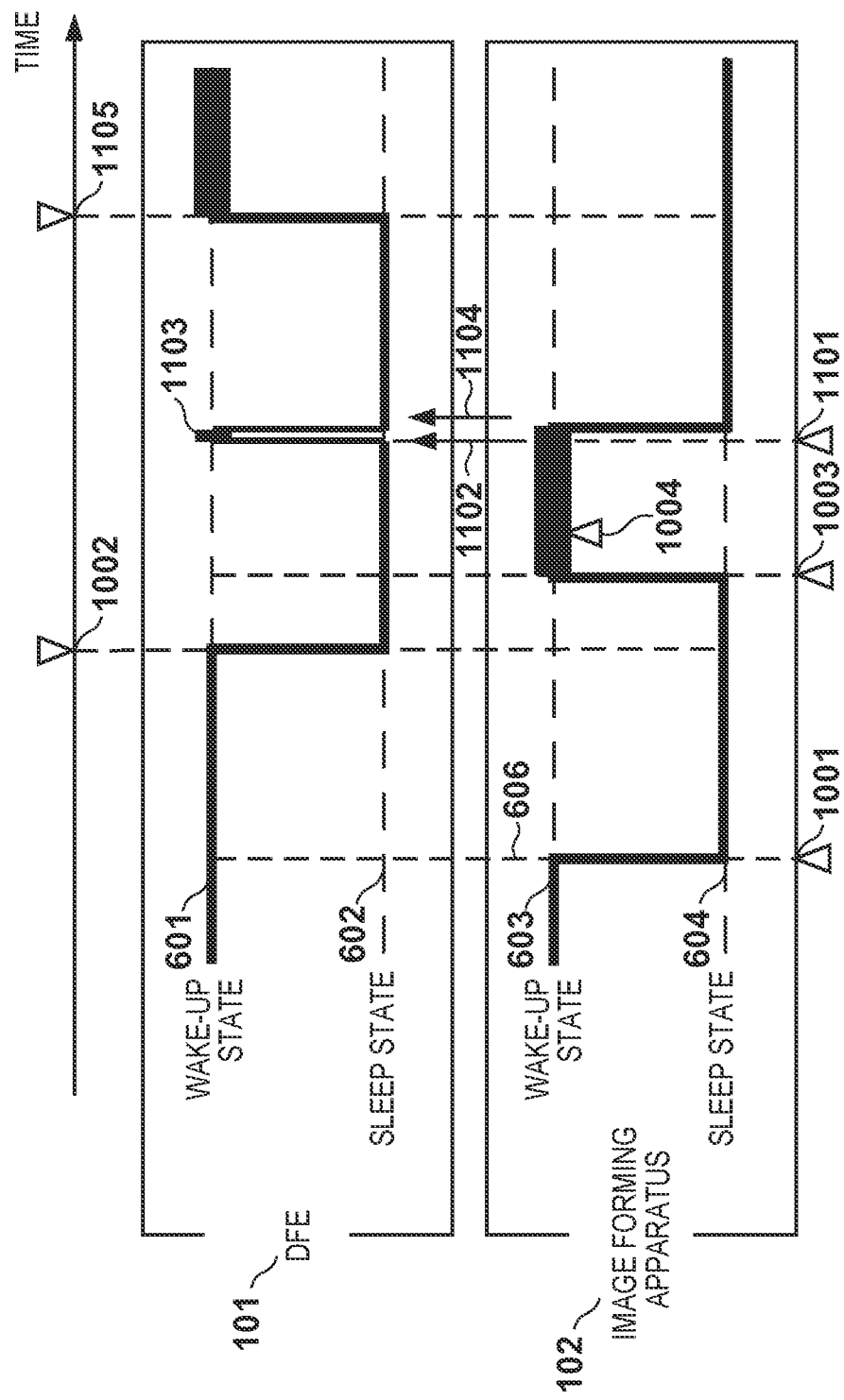
FIG. 11 depicts a view for explaining an operation sequence for explaining further another example in which the external image processing controller and the image forming apparatus according to embodiments shift to sleep state.

FIG. 11 is a sequence diagram for explaining another example in which the external image processing controller 101 and the image forming apparatus 102 according to embodiments shift to the sleep state. Note that parts common to the previously described drawings are indicated with the same reference numerals. Here, in addition to FIG. 10, prior to the external image processing controller 101 recovering from the sleep state at a timing 1105, the image forming apparatus 102, once again, shifts to the sleep state at a timing 1101. More specifically, up until the media library modification operation by the user at the timing 1004 is the same as FIG. 10, but after the timing 1101 is changed.

Similarly to the timing 901 of FIG. 9, prior to the image forming apparatus 102 itself shifting into the sleep state at the timing 1101, the image forming apparatus 102 performs a wake-up notification towards the external image processing controller 101 at a timing 1102. When the external image processing controller 101 receives the wake-up notification, the external image processing controller 101 recovers from the sleep state at a timing 1103. Then, after the image forming apparatus 102 confirms that the external image processing controller 101 has recovered, the image forming apparatus 102 makes a notification of the media library modification information at a timing 1104. When this notification completes, the external image processing controller 101 once again shifts into the sleep state. Also, the image forming apparatus 102 shifts to the sleep state here. Then, at the timing 1105, the external image processing controller 101 wakes up from the sleep state. At the timing 1105, the external image processing controller 101 is able to obtain information for which the media library has been modified in the image forming apparatus 102. For this reason, the external image processing controller 101 is able to display identifiably hold jobs for which a media mismatch occurs by displaying the media mismatch information, as shown in FIG. 7, for example.

Figure 12:
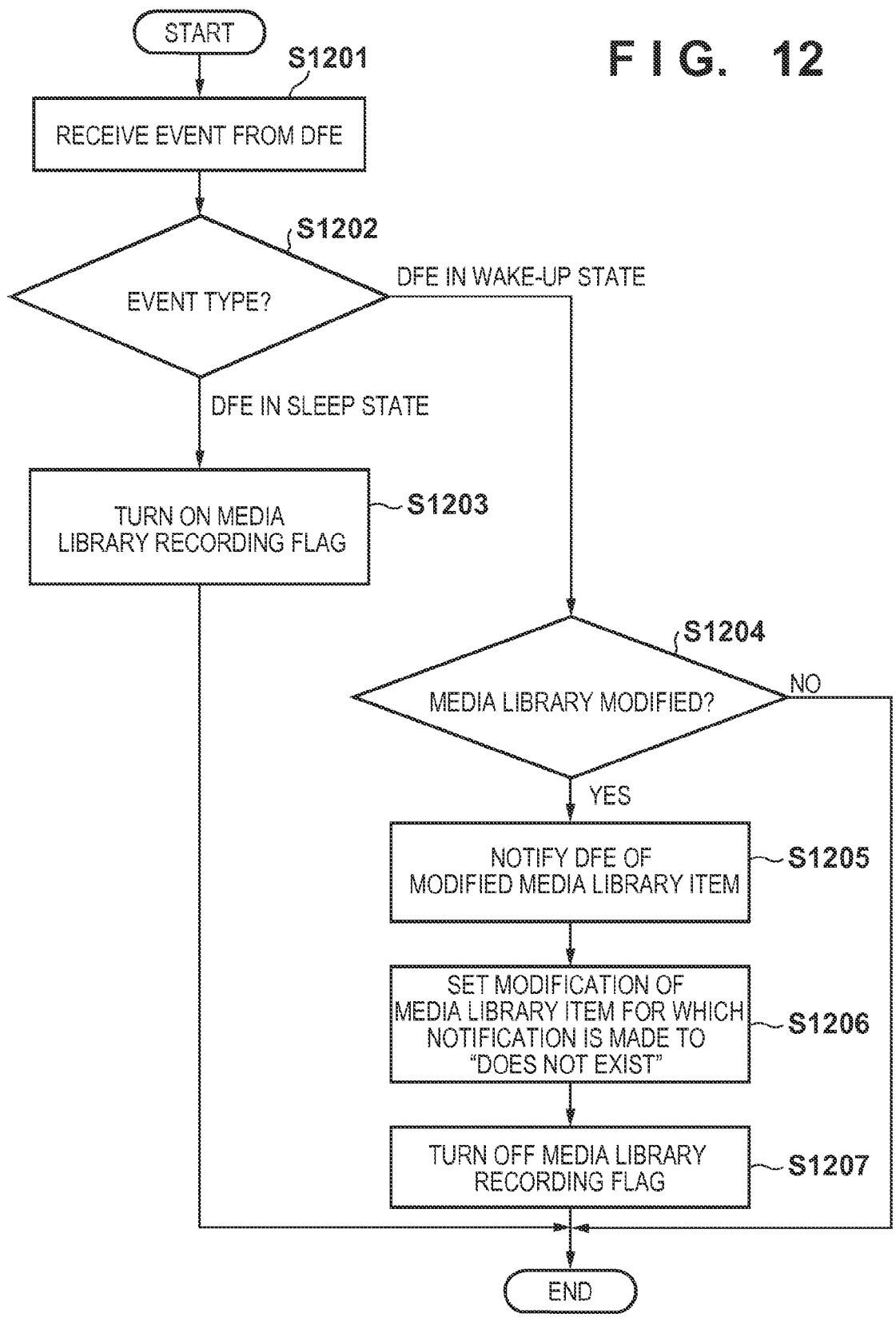
FIG. 12 is a flowchart for describing processing of a media library processing module of the image forming apparatus according to embodiments.

FIG. 12 is a flowchart for describing processing of the media library processing module 507 of the image forming apparatus 102 according to embodiments. More specifically, at the timing 611 of FIG. 6, and at the timing 1006 of FIG. 10, processing for a case in which an event notification is received from the external image processing controller 101 is shown. Note that the program executing this processing is stored in the memory 408, is deployed into the RAM 403 upon execution, and is executed under the control of the CPU 402.

In step S1201, the CPU 402 receives an event from the external image processing controller 101. More specifically, an event packet is received via the network I/F 406. Next, the processing proceeds to step S1202, and the CPU 402 determines the type of the event received in step S1201. Here, if it is determined that the notification is that the external image processing controller 101 shifted from the wake-up state to the sleep state, the processing proceeds to step S1203, the CPU 402 turns on the media library recording flag in the RAM 403, and the processing completes.

FIG. 13 depicts a view for explaining the media library recording flag according to embodiments.

The media library recording flag 1301 takes ON and OFF states, and a case in which the media library recording flag 1301 is ON, as shown in reference numeral 1301 of FIG. 13, represents the state where the media library recording flag 1301 is turned on in step S1203. Here because the external image processing controller 101 shifts to the sleep state, this flag is for instructing that media library modifications be recorded during the sleep state of the external image processing controller 101.

Meanwhile, in a case of a notification that the external image processing controller 101 shifts from the sleep state to the wake-up state in step S1202, the processing proceeds to step S1204, and the CPU 402 confirms the media library modification information stored in the RAM 403. If, in step S1204, any of the media data is modified, the CPU 402 advances the processing to step S1205, and if none of the media data is modified, the process is terminated. In step S1205, the CPU 402 notifies the external image processing controller 101 of the media for which the media library item has been modified during the external image processing controller 101 was in the sleep state.

For example, as in a table 1302 of FIG. 13, the media library is managed in the RAM 403. As shown by reference numeral 1303, "exists/does not exist" of a modification for each medium is recorded. In the example of FIG. 13, the data of the media A (Media A) was modified while the external image processing controller 101 was in the sleep state. Accordingly, the CPU 402 notifies the external image processing controller 101 that the data of the media A has been modified.

Next, the processing proceeds to step S1206, and the CPU 402 changes the modification "exists" of the media library item, stored in the RAM 403, for which the notification was made in step S1205 to "does not exist". For example, in the example of FIG. 13, modification information 1302 of the media A is changed from "exists" to "does not exist". Then, the processing proceeds to step S1207, the CPU 402 turns off the media library recording flag 1301 stored in the RAM 403, and the processing completes.

Figure 14:
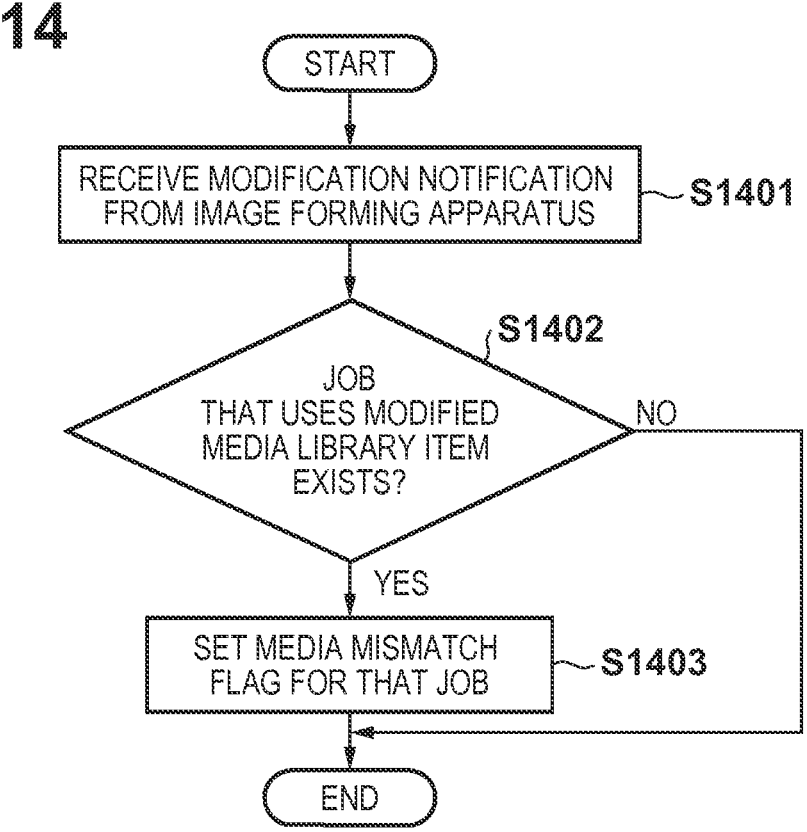
FIG. 14 is a flowchart for describing processing of the media library processing module of the external image processing controller according to embodiments.

FIG. 14 is a flowchart for describing processing of the media library processing module 314 of the external image processing controller 101 according to embodiments. This processing is realized by deploying a program stored in the HDD 204 of the external image processing controller 101 into the RAM 203, and the CPU 201 executing that program.

Firstly, in step S1401, the CPU 201 receives the media library modification notification from the image forming apparatus 102. More specifically, in the example of FIG. 13, for example, because the data of the media A is modified, the modification notification, that indicates that the media data of the media A is modified, is received. Next, the processing proceeds to step S1402, and the CPU 201 determines whether or not there is a job that uses the media indicated in the notification received in step S1401 in the hold jobs, and if there is such a job, the processing proceeds to step S1403, and if there is no such job, the processing completes. In step S1403, the CPU 201 sets the media mismatch flag in the RAM 203 for the hold jobs that use the media for which the media data is modified in step S1402, and the processing completes.

In this way, in a case where the media mismatch flag is set, and when the list of hold jobs is displayed, it is possible to present to a user that the media mismatch occurred for corresponding hold jobs as in reference numerals 701 and 702 in FIG. 7, for example.

Figure 15:
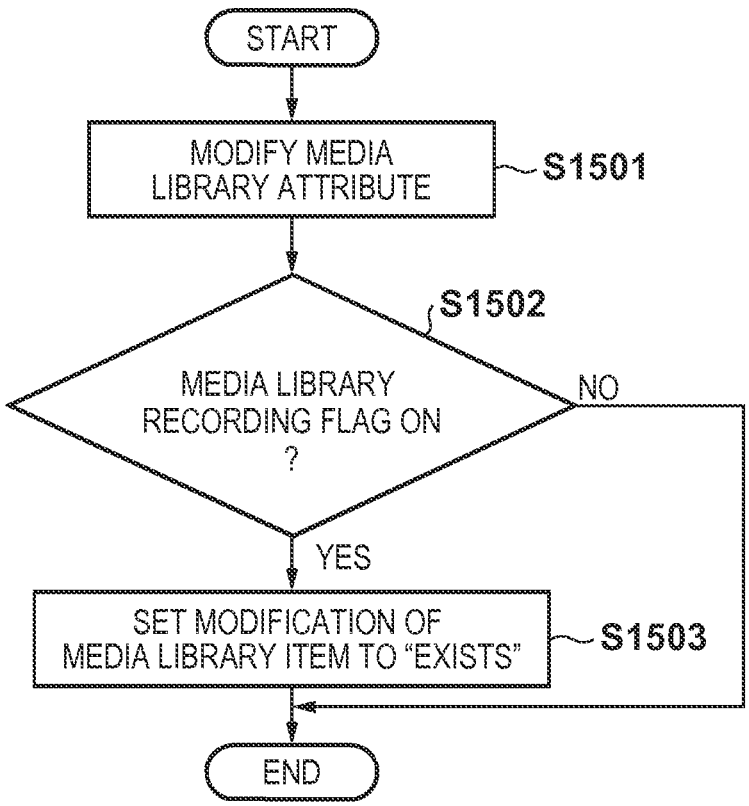
FIG. 15 is a flowchart for describing processing of the media library processing module of the image forming apparatus according to embodiments.

FIG. 15 is a flowchart for describing processing of the media library processing module 507 of the image forming apparatus 102 according to embodiments. Specifically, processing is shown for a case where, at the timing 609 of FIG. 6 or the timing 1004 of FIG. 10, a user, using the console unit 405, the media library of the image forming apparatus 102 is modified. Note that the program executing this processing is stored in the memory 408, is deployed into the RAM 403 upon execution, and is executed under the control of the CPU 402.

Firstly, in step S1501, the CPU 402 modifies the attribute information of the media library of the image forming apparatus 102. More specifically, attributes such as the media library weight and size shown in reference numeral 1302 of FIG. 13 are modified. Next, the processing proceeds to step S1502, and the CPU 402 determines whether or not the media library recording flag 1301 recorded in the RAM 403 is ON. When it is determined that this flag is ON here, the processing proceeds to step S1503 because it is necessary to record the modification, and so the CPU 402 records that there is a modification on the media for which the media data is modified, and the processing completes. With this, for example, the "exists/does not exist" of the modification of the media A of FIG. 13 is modified to be "exists". Meanwhile, in step S1502, if the media library recording flag 1301 is OFF, the processing completes as is because it is not necessary to record the modification information.

Figure 16:
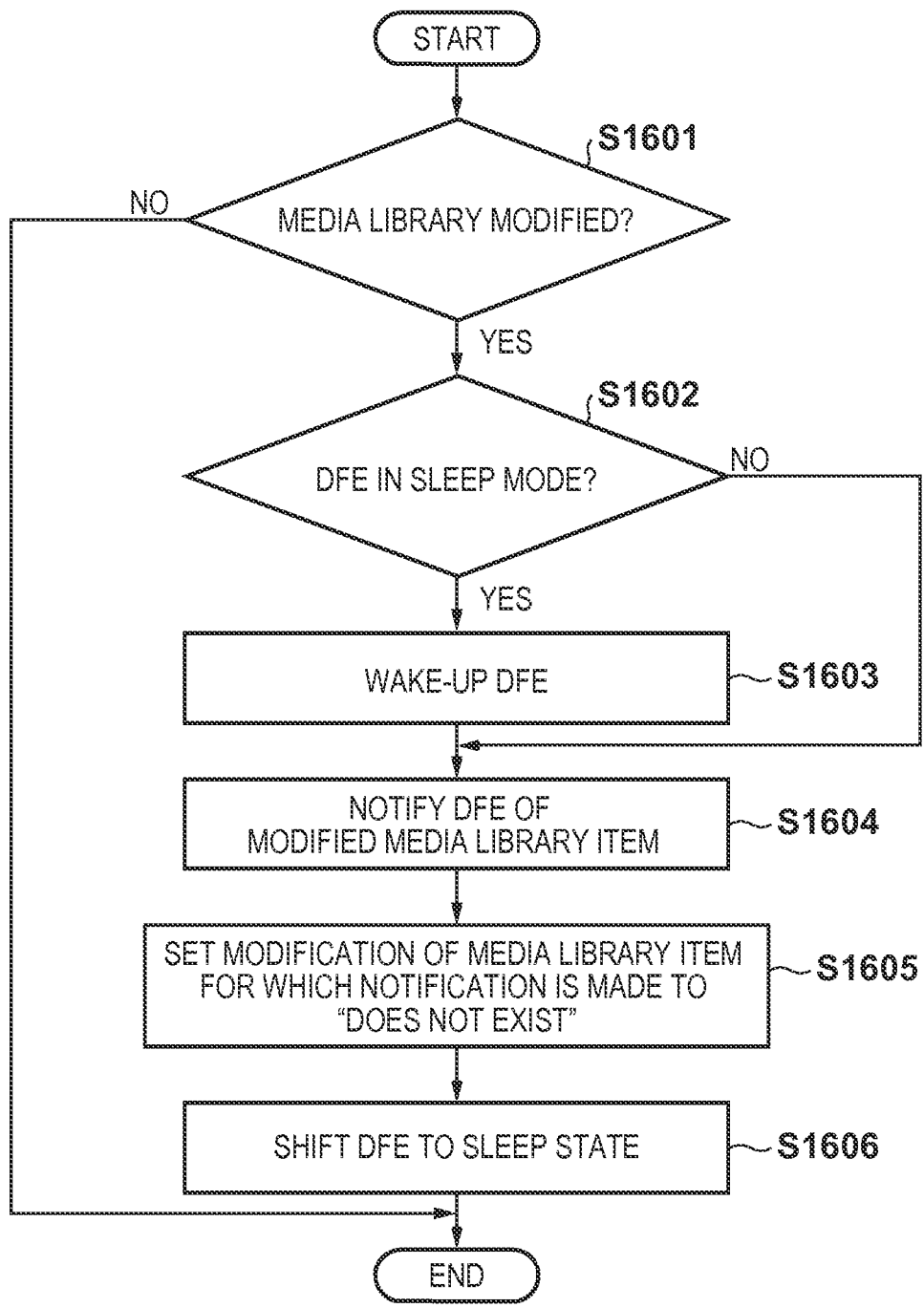
FIG. 16 is a flowchart for describing processing of the media library processing module of the image forming apparatus according to embodiments.

FIG. 16 is a flowchart for describing processing of the media library processing module 507 of the image forming apparatus 102 according to embodiments. Specifically, explanation will be given processing for a case where the image forming apparatus 102 shifts from the wake-up state to the sleep state as is the case at the timing 901 of FIG. 9 and the timing 1101 of FIG. 11. Note that the program executing this processing is stored in the memory 408, is deployed into the RAM 403 upon execution, and is executed under the control of the CPU 402.

Firstly, the CPU 402, in step S1601, determines whether or not there is even one modification of an attribute of the media library of the image forming apparatus 102. More specifically, it is determined whether or not attribute information was modified in the media library of the table of FIG. 13. Here, when even one attribute is modified, the processing proceeds to step S1602, and otherwise the processing completes.

In step S1602, the CPU 402 determines whether or not the external image processing controller 101 is in the sleep state. More specifically, it is determined whether or not the external image processing controller 101 is in the sleep state by trying communication with the external image processing controller 101 via the network I/F 406. If it is determined that the external image processing controller 101 is in the sleep state, the processing proceeds to step S1603, and the external image processing controller 101 is caused to wake up by transmitting a wake-up notification to the external image processing controller 101, and then the processing proceeds to step S1604. More specifically, the external image processing controller 101 is caused to wake up by transmitting a wake-up instruction packet to the external image processing controller 101 via the network I/F 406, and waiting until the wake-up of the external image processing controller 101 completes. Also, if it is determined that the external image processing controller 101 is waked up in step S1602, the CPU 402 advances the processing to step S1604.

In step S1604, the CPU 402 notifies the external image processing controller 101 of the name of the media, found in step S1601, for which the media library was modified. This processing is the same processing as that of step S1205 of FIG. 12. Then, the processing proceeds to step S1605, and the CPU 402 returns the modification information of the media library item to "does not exist" for each of the media for which notification was made in step S1604. This processing is the same processing as that of step S1206 of FIG. 12. Then, the processing proceeds to step S1606, and the CPU 402 makes an instruction towards the external image processing controller 101 so that the external image processing controller 101 shifts to the sleep state because the media library modification notification has completed. More specifically, the CPU 402 causes the external image processing controller 101 to shift to the sleep state by transmitting a sleep instruction packet to the external image processing controller 101 via the network I/F 406. Then the CPU 402 causes the image forming apparatus 101 to shift into the sleep state, and the processing completes.

Figure 17:
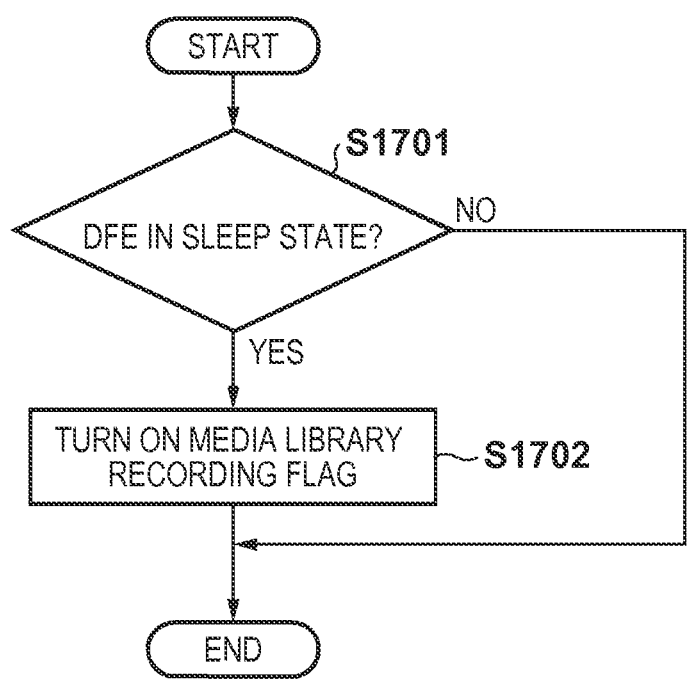
FIG. 17 is a flowchart for describing processing of the media library processing module of the image forming apparatus according to embodiments.

FIG. 17 is a flowchart for describing processing of the media library processing module 507 of the image forming apparatus 102 according to embodiments. Specifically, processing for a case in which the image forming apparatus 102 shifts from the sleep state to the wake-up state, as in the timing 1003 of FIG. 10, is illustrated. Note that the program executing this processing is stored in the memory 408, is deployed into the RAM 403 upon execution, and is executed under the control of the CPU 402.

Firstly, the CPU 402, as wake-up processing, determines whether or not the external image processing controller 101 is in the sleep state in step S1701. This processing is the same processing as that of step S1602 of FIG. 16. Here, in a case where it is determined that the external image processing controller 101 is in the sleep state, the processing proceeds to step S1702, and in a case where it is determined that the external image processing controller 101 is waked up, the process is terminated. In step S1702, the CPU 402 sets the media library recording flag 1301 in the RAM 403 to "ON". This processing is the same processing as that of step S1203 of FIG. 12.

With this, the media library modification made on the image forming apparatus 102 can be recorded while the external image processing controller 101 is in the sleep state. Then, after this, when the external image processing controller 101 wakes up, the external image processing controller 101 can be notified of the media mismatch.

Note that in the above described embodiments, an example is shown in which the media library information on the image forming apparatus 102 is modified, but configuration may also be taken for a case where paper of the sheet feeding cassettes of the image forming apparatus 102 is changed. More specifically, it is possible to adapt to a case in which the paper information for each sheet feeding cassette is changed in place of the media library information of FIG. 13. In such a case, instead of notifying of the media library modification in reference numeral 612 of FIG. 6, the external image processing controller 101 is notified of the sheet feeding cassette in which a paper is changed. With this, it is possible to make a notification for a media mismatch of a hold job for which the sheet feeding cassette is changed out of the hold jobs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-214138, filed Oct. 11, 2013, which is hereby incorporated by reference herein in its entirety.

What is claimed is:

1. An image forming apparatus capable of being connected to a network via a print server, the image forming apparatus comprising:
   an update unit configured to update media data in response to a modification operation for modification of the media data;
   a starting unit configured to start a recording of the updating of the media data by the update unit when the print server is in a power saving state; and
   a transmission unit configured to transmit to the print server, in a case where the updating of the media data by the update unit has been recorded when a notification that the print server returned from the power saving state is received, the updated media data.

2. The image forming apparatus according to claim 1, wherein the starting unit recognizes that the print server is in the power saving state by a notification, from the print server, that the print server shifts to the power saving state.

3. An image forming apparatus connected to a network via a print server, the apparatus comprising:
   an update unit configured to update media data in response to a modification operation for modification of the media data;
   a starting unit configured to start a recording of the updating of the media data by the update unit when the print server is in a power saving state;
   a determination unit configured to determine, when the image forming apparatus shifts to the power saving state, whether the recording of the updating of the media data by the update unit is started by the starting unit; and
   a transmission unit configured to transmit to the print server, when the determination unit determines that the recording of the updating of the media data is started, and the updating of the media data by the update unit has been recorded, the updated media data.

4. The image forming apparatus according to claim 3, wherein the transmission unit comprising a wake-up unit configured to wake up the print server if the print server is in the power saving state,
   wherein the transmission unit transmits to the print server, after the print server wakes up due to the wake-up unit, the updated media data.

5. The image forming apparatus according to claim 3, further comprising a shift unit configured to shift the image forming apparatus to the power saving state after transmission by the transmission unit.

6. The image forming apparatus according to claim 3, wherein the starting unit further starts, if, when the image forming apparatus recovers from the power saving state, the print server is in the power saving state, the recording of the updating of the media data by the update unit.

7. The image forming apparatus according to claim 1, wherein the media data includes information of a sheet feeding cassette of the image forming apparatus that houses media.

8. A printing system in which an image forming apparatus is capable of connecting to a network via a print server, the printing system comprising:
   the image forming apparatus, comprising:
   an update unit configured to update media data in response to a modification operation for modification of the media data;
   a starting unit configured to start a recording of the updating of the media data by the update unit when a notification that the print server shifts into a power saving state is received; and
   a transmission unit configured to transmit to the print server, in a case where the updating of the media data by the update unit has been recorded when a notification that the print server returned from the power saving state is received, the updated media data, and
   the print server, comprising:
   a display unit configured to display identifiably a job having a media mismatch based on the updated media data transmitted by the transmission unit.

9. A method of controlling an image forming apparatus capable of being connected to a network via a print server, the method comprising:
   updating media data in response to a modification operation for modification of the media data;
   starting a recording of the updating of the media data in the updating step when the print server is in a power saving state; and
   transmitting to the print server, in a case where the updating of the media data in the updating step has been recorded when a notification that the print server returned from the power saving state is received, the updated media data.

10. A non-transitory computer-readable storage medium storing a program for causing a computer to function as the image forming apparatus comprising:
   an update unit configured to update media data in response to a modification operation for modification of the media data;
   a starting unit configured to start a recording of the updating of the media data by the update unit when the print server is in a power saving state; and
   a transmission unit configured to transmit to the print server, in a case where the updating of the media data by the update unit has been recorded when a notification that the print server returned from the power saving state is received, the updated media data.

* * * * *